United States Patent
Nakayama et al.

(10) Patent No.: US 9,013,284 B2
(45) Date of Patent: Apr. 21, 2015

(54) VEHICLE PRESENCE NOTIFICATION APPARATUS

(75) Inventors: Toshiaki Nakayama, Miyoshi (JP); Junichi Ishikawa, Kariya (JP)

(73) Assignee: Denso Corporation, Kariya (JP)

( * ) Notice: Subject to any disclaimer, the term of this patent is extended or adjusted under 35 U.S.C. 154(b) by 655 days.

(21) Appl. No.: 13/425,662

(22) Filed: Mar. 21, 2012

(65) Prior Publication Data
US 2012/0242468 A1 Sep. 27, 2012

(30) Foreign Application Priority Data
Mar. 22, 2011 (JP) .................... 2011-62915

(51) Int. Cl.
*B60Q 1/00* (2006.01)
*B60Q 5/00* (2006.01)
*G10K 15/02* (2006.01)

(52) U.S. Cl.
CPC ............... *B60Q 5/008* (2013.01); *G10K 15/02* (2013.01)

(58) Field of Classification Search
CPC .................................. B60Q 5/00; B60Q 5/008
USPC ........... 340/425.5, 384.3, 384.73, 388.1, 435, 340/474
See application file for complete search history.

(56) References Cited

U.S. PATENT DOCUMENTS

| | | | |
|---|---|---|---|
| 2005/0200462 A1* | 9/2005 | Maekawa et al. | 340/435 |
| 2005/0286346 A1* | 12/2005 | Croft et al. | 367/140 |
| 2007/0257783 A1* | 11/2007 | Matsumoto et al. | 340/425.5 |
| 2011/0032122 A1 | 2/2011 | Hayashi et al. | |
| 2011/0304445 A1 | 12/2011 | Nakayama | |

FOREIGN PATENT DOCUMENTS

| | | |
|---|---|---|
| JP | 2000-036993 | 2/2000 |
| JP | 2005-289175 | 10/2005 |
| JP | 2006-021667 | 1/2006 |
| JP | 3156243 | 12/2009 |

OTHER PUBLICATIONS

U.S. Appl. No. 13/154,681 of Nakayama, filed Jun. 7, 2011.
Office Action (2 pages) dated Jan. 22, 2013, issued in corresponding Japanese Application No. 2011-062915 and English translation (2 pages).

* cited by examiner

*Primary Examiner* — Tai T Nguyen
(74) *Attorney, Agent, or Firm* — Nixon & Vanderhye PC (57) ABSTRACT

A vehicle presence notification apparatus may include a dynamic speaker for radiating a notification sound from a vehicle in an audible frequency, and a sound pressure supplement unit is provided to control a sound pressure of the notification sound. The apparatus may further include a parametric speaker for generating a supersonic sound of the notification sound from a supersonic sound generation unit. The supersonic sound is emitted from a sound emission opening. The parametric speaker may further include a reflected sound pressure detecting unit for detecting a sound pressure generated by a reflection of the supersonic sound from the sound emission opening. The sound pressure supplement unit increases the sound pressure of the notification sound radiated by the dynamic speaker based on the sound pressure detected by the reflected sound pressure detecting unit.

5 Claims, 7 Drawing Sheets

FIG. 7C  AMPLITUDE-MODULATED SUPERSONIC WAVE

FIG. 7D  WARPED SUPERSONIC WAVE

FIG. 7E  AFTER SELF-DEMODULATION

VEHICLE PRESENCE NOTIFICATION APPARATUS

CROSS REFERENCE TO RELATED APPLICATION

The present application is based on and claims the benefit of priority of Japanese Patent Application No. 2011-62915, filed on Mar. 22, 2011, the disclosure of which is incorporated herein by reference.

TECHNICAL FIELD

The present disclosure generally relates to a vehicle presence notification apparatus that generates a notification sound for notifying a pedestrian around a vehicle about the approach and presence of the vehicle.

BACKGROUND

Conventionally, a warning device that outputs a sound to notify others of the approach of a vehicle is disclosed in Japanese Patent Laid-Open No. 2005-289175 (JP '175). The vehicle warning apparatus of JP '175 generates a warning sound from a dynamic speaker.

A vehicle warning apparatus may also use a different type of speaker that provides a strong directivity to generate a warning sound, such as a parametric speaker. The parametric speaker is a device that emits, from a supersonic speaker, an audible sound (i.e., a notification sound) after supersonic modulation of the wave form signal of the audible sound. The supersonic sound (i.e., a non-audible sound) emitted from the supersonic speaker has a modulated sound component that is self-demodulated during the transmission of the wave in air, thereby generating an audible sound (i.e., the notification sound) at a distant position from the vehicle.

The supersonic speaker used in the parametric speaker may have snow or other foreign matter attached on a sound emission opening of the supersonic speaker. When foreign matter accumulates on the sound emission opening, the accumulated foreign matter reflects the supersonic sound due to the nature of the supersonic sound. That is, even if the foreign matter is very light object, such as snow, the supersonic sound from multiple supersonic transducers is reflected by the snow on the sound emission opening, decreasing the sound pressure of the supersonic sound before it is emitted through the sound emission opening towards an area outside the vehicle.

SUMMARY

This section provides a general summary of the disclosure, and is not a comprehensive disclosure of its full scope or all of its features. A vehicle presence notification apparatus disposed in a vehicle may include a dynamic speaker and a parametric speaker for emitting a notification sound from the vehicle. The dynamic speaker generates the notification sound in an audible frequency, and may include a sound pressure supplement unit to control a sound pressure of the notification sound.

The parametric speaker may include a supersonic speaker for generating a supersonic sound from a supersonic sound generation unit. The supersonic sound generation unit may be disposed in a housing. The housing may define a sound emission opening from which the supersonic sound is emitted outward from the vehicle. The parametric speaker may further include a reflected sound pressure detecting unit that detects a reflected sound pressure generated by a reflection of the supersonic sound from the sound emission opening toward the parametric speaker.

The sound pressure supplement unit may increase the sound pressure of the notification sound radiated by the dynamic speaker based on the reflected sound pressure detected by the reflected sound pressure detecting unit.

The supersonic sound generation unit used in the above configuration may be disposed as an array or a collection of the supersonic transducers that generate a compression wave of supersonic wavelength, and the reflected sound pressure detecting unit may be provided as at least one of the supersonic transducers.

BRIEF DESCRIPTION OF THE DRAWINGS

Objects, features, and advantages of the present disclosure will become more apparent from the following detailed description made with reference to the accompanying drawings, in which.

DETAILED DESCRIPTION

With reference to the drawings, a vehicle presence notification apparatus of the present disclosure is now explained. The following description is merely exemplary in nature and is in no way intended to limit the disclosure, its application, or uses. For purposes of clarity the same reference numbers will be used in the drawings to identify similar elements.

A vehicle presence notification apparatus is disposed in a vehicle, and generates a notification sound to notify pedestrians of the existence or presence of the vehicle. The vehicle may be a quiet vehicle, such as: an engine-less vehicle (i.e., an electric vehicle, a fuel-cell-powered vehicle, and the like); an engine-stop vehicle that stops the engine during a travel/stop of the vehicle (i.e. a hybrid vehicle); an idle stop vehicle that stops the engine when the vehicle is not moving, by way of an idle stop function; or a conventional vehicle that radiates little to no sound during travel/stop. The notification sound may be a single sound, a chord, a music, a simulated-engine sound, or the like.

Figure 1:
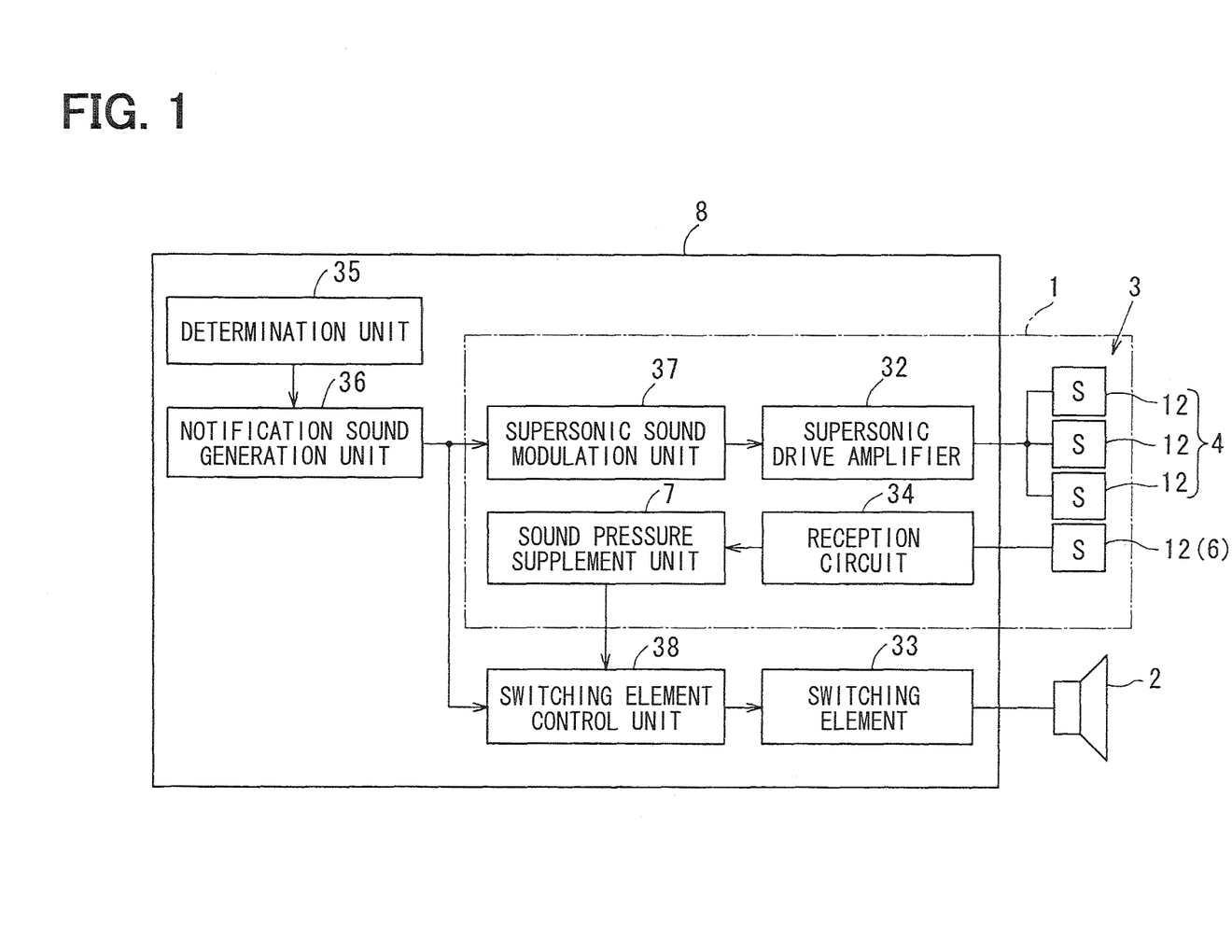
FIG. 1 is a block diagram of a vehicle presence notification apparatus of the present disclosure.
Figure 2:
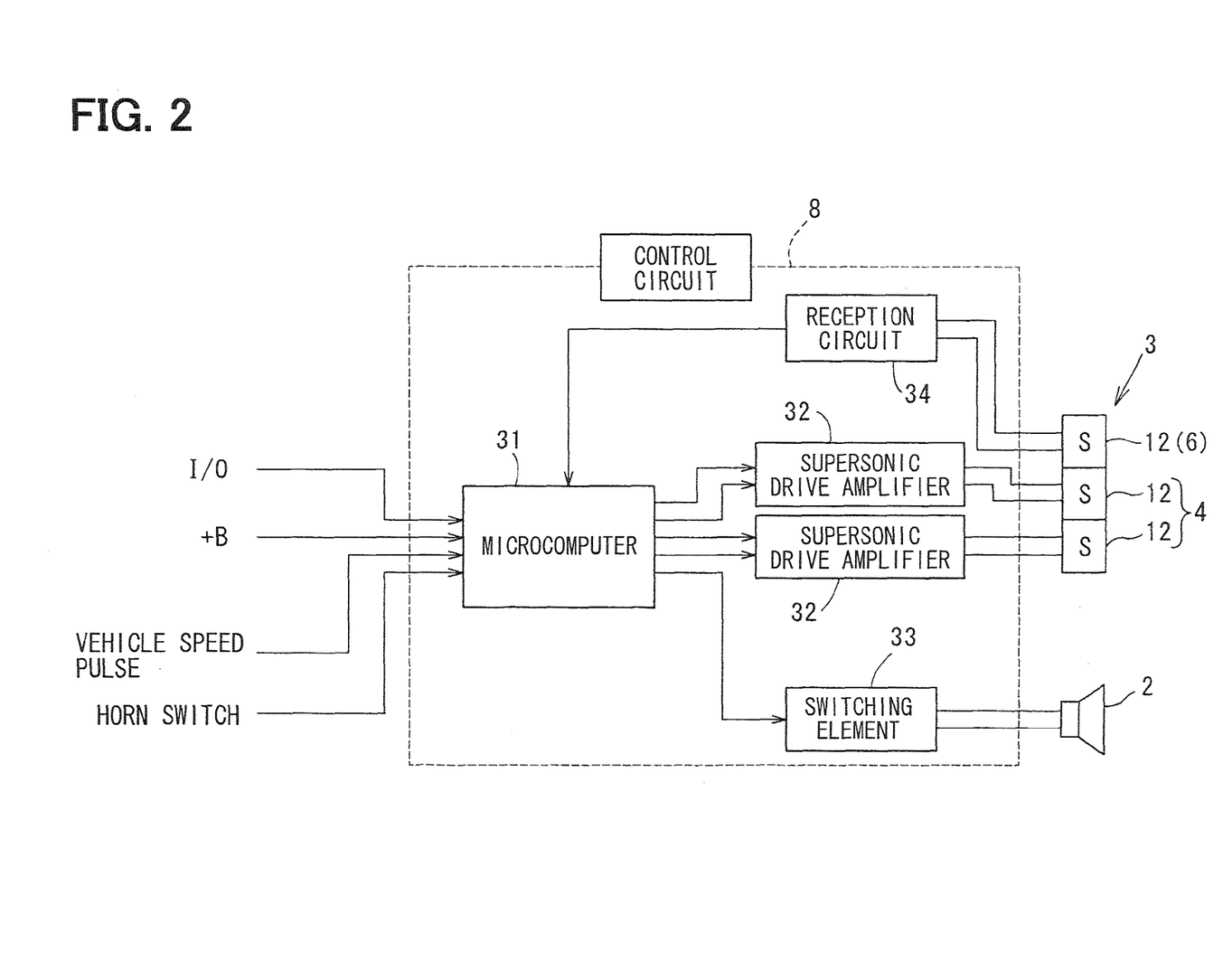
FIG. 2 is a block diagram of a control circuit of the vehicle presence notification apparatus of the present disclosure.
Figure 3:
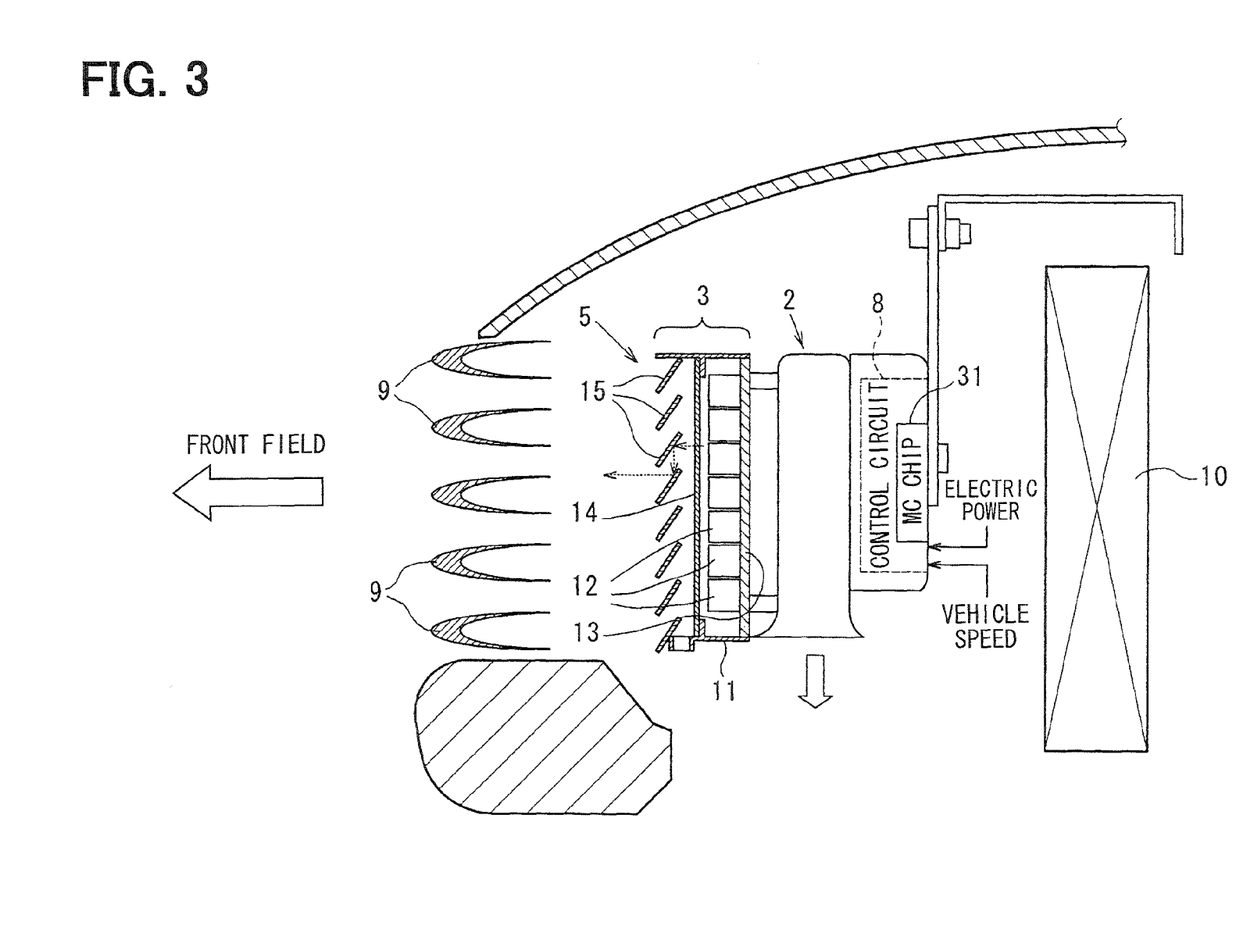
FIG. 3 is an illustration of an installation position of the vehicle presence notification apparatus of the present disclosure.

With reference to FIGS. 1, 2, and 3 the vehicle presence notification apparatus in the present disclosure includes a parametric speaker 1, a vehicular horn 2, and a control circuit 8 for controlling an operation of the parametric speaker 1 and the vehicular horn 2.

The parametric speaker 1 includes a supersonic speaker 3 for generating a supersonic wave (i.e. a supersonic sound). The supersonic speaker 3 produces an air vibration that has a frequency higher than the human audible range (i.e., greater than 20 kHz). The supersonic speaker 3 includes a supersonic sound generation unit 4 and a speaker housing 11. The speaker housing 11 defines a sound emission opening 5, and the supersonic sound generation unit 4 is disposed inside of the speaker housing 11.

The supersonic speaker 3 may be disposed between a heat exchanger 10 and a front grille 9 on a front facing side of the vehicular horn 2, such that the supersonic sound is emitted in a front field direction of the vehicle. Specifically, the speaker housing 11 may be disposed along side of a swirl horn 28 of the vehicular horn 2 (FIG. 4B), such that the sound emission opening is directed towards the front grille 9 (i.e. the front field). Accordingly, the supersonic sound radiates outward from the sound emission opening 5, towards a front field of the vehicle.

The supersonic sound generation unit 4 includes a plurality of supersonic transducers 12 generating air vibration of contraction wave having a supersonic frequency, which is collectively disposed on the same plane (FIGS. 1-3). More practically, the plurality of supersonic transducers 12 are arranged as a speaker array on a support board 13 disposed inside the speaker housing 11 (FIG. 3).

Each of the plurality of the supersonic transducers 12 in the present embodiment is a small piezoelectric speaker, formed as a combination of the piezoelectric elements, which expand and contract according to the applied voltage (i.e., charge and discharge of electricity), and a supersonic vibration board that generates the compression wave when driven by the piezoelectric elements.

With continuing reference to FIG. 3, the supersonic sound is generated from each of the supersonic transducers 12, and is emitted toward the front field by way of the sound emission opening 5. The sound emission opening 5 includes a waterproof device that prevents intrusion of water and other foreign particles into the piezoelectric speakers 12. For example, in the present embodiment, the waterproof device is provided as a waterproof sheet 14 that covers the sound emission opening 5 and has a supersonic sound transmitting characteristics. The waterproof device also includes a louver 15 that is positioned in front of the waterproof sheet 14 (FIG. 3).

The louver 15 is arranged in front of the waterproof sheet 14 to substantially reduce the amount of water that may reach the waterproof sheet 14, and to prevent water from directly hitting the waterproof sheet 14. The louver 15 is formed as multiple narrow boards that are disposed in parallel with gaps interposed therebetween.

The louver 15 can be disposed at an angle of 45 degrees against the vehicle's level (i.e., horizontal) direction. In such manner, the supersonic sound outputted from each of the supersonic transducers 12 is reflected into a downward direction on an inside of the louver 15, and is then reflected again to a horizontal direction on an outside of the louver 15 toward the front field of the vehicle.

With continuing reference to FIGS. 1 and 2, the supersonic speaker 3 further includes a reflected sound pressure detecting unit 6 for detecting the sound pressure of the supersonic sound that is reflected back from the sound emission opening 5 toward each of the supersonic transducers 12.

The reflected sound pressure detecting unit 6 in the present embodiment is implemented as one of the supersonic transducers 12 that are arranged in a collective manner. Since, the supersonic transducers 12 are a small piezoelectric speaker having a piezoelectric element and a supersonic vibration board, as described above, the vibration of the piezoelectric element is picked up as an electric signal when air vibration such as a supersonic sound vibrates the supersonic vibration board.

(Vehicular Horn 2)

The vehicular horn 2 is disposed between the front grille 9 and the heat exchanger 10 (FIG. 3), and generates, as an electromagnetic type horn, a warning sound when a horn switch (e.g., a button on a steering wheel) is operated by an occupant of the vehicle (i.e. turned ON).

Figure 4A:
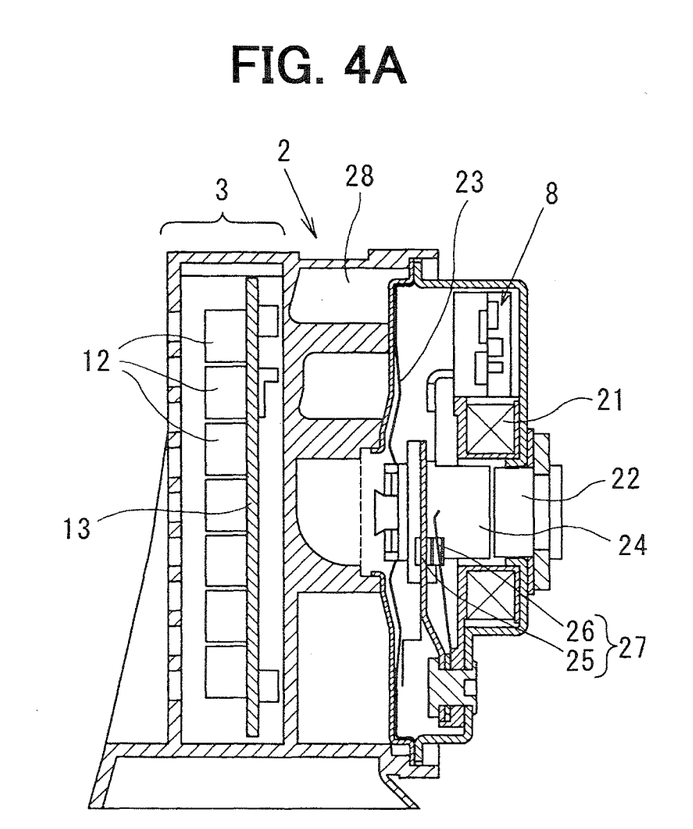
FIG. 4A is a cross-section of the vehicle presence notification apparatus of the present disclosure.

With reference to FIG. 4A, the vehicular horn 2 includes a coil 21, a fixed iron core 22, a movable iron core 24, and a movable contact point 26. The fixed iron core 22 outputs an attraction force that is generated as a magnetic force from the coil 21, and may be referred to as a magnetic attraction core.

The movable iron core 24 is supported at the center of a vibration board 23 or a diaphragm. The attraction force provided by the fixed core 22, moves the movable iron core 24 towards the fixed iron core 22, and, as a result, the movable contact point 26 decouples from a fixed contact point 25, which interrupts the electric current supplied to the coil 21.

In particular, a self-excitation voltage is supplied across the coil 21 via power terminals that are coupled to the ends of the coil 21, and a current flows across the coil 21. When the self-excitation voltage is above a threshold (i.e., the voltage is equal to or greater than 8 V), an attracting action and a returning action is repeatedly performed within the vehicular horn 2.

Specifically, in regards to the attracting action, when the current flows through the coil 21, an electromagnetic field is generated and an attraction occurs between the movable iron core 24 and the fixed iron core 22, such that the movable iron core 24 moves towards the fixed iron core 22. Due to the movement of the movable iron core 24 towards the fixed iron core 22, the movable contact point 26 decouples from the fixed contact point 25, causing the current to stop flowing through the coil 21.

Once, the current has stopped flowing through the coil 21, the electromagnetic field is no longer generated and the movable iron core 24 returns to its initial position, which is the returning action. Due to the biasing of the movable iron core 24, the movable contact point 26 couples with the fixed contact point 25, and the current resumes flowing through the coil 21, thus restarting the attracting action.

In other words, when the self-excitation voltage is equal to or greater than the threshold voltage, the current flows through the coil 21, and an electric current interrupter 27, which allows and prevents the current from flowing through the coil 21, is formed by the fixed contact point 25 and the movable contact point 26.

Due to the attracting and returning action, the movable iron core 24 causes a vibration of the vibration board 23, and the vehicular horn 2 generates the warning sound. The frequency characteristics of the warning sound generated when the self-excitation voltage is greater than or equal to 8 V by the vehicular horn 2 is shown by a solid line A in FIG. 5.

Further, in the present embodiment, the vehicular horn 2 is operated as a dynamic speaker by providing a driving signal of a separate excitation voltage that is lower than the self-excitation voltage for the vehicular horn 2, such as a voltage lower than 8 V.

Alternatively, even when the self-excitation voltage is provided, the quick interruption and connection of the electricity in the coil 21 (e.g., PWM control or the like), which do not allow the connection and disconnection of the electric current interrupter 27, can be used to control the vehicular horn 2 as a dynamic speaker.

Figure 5:
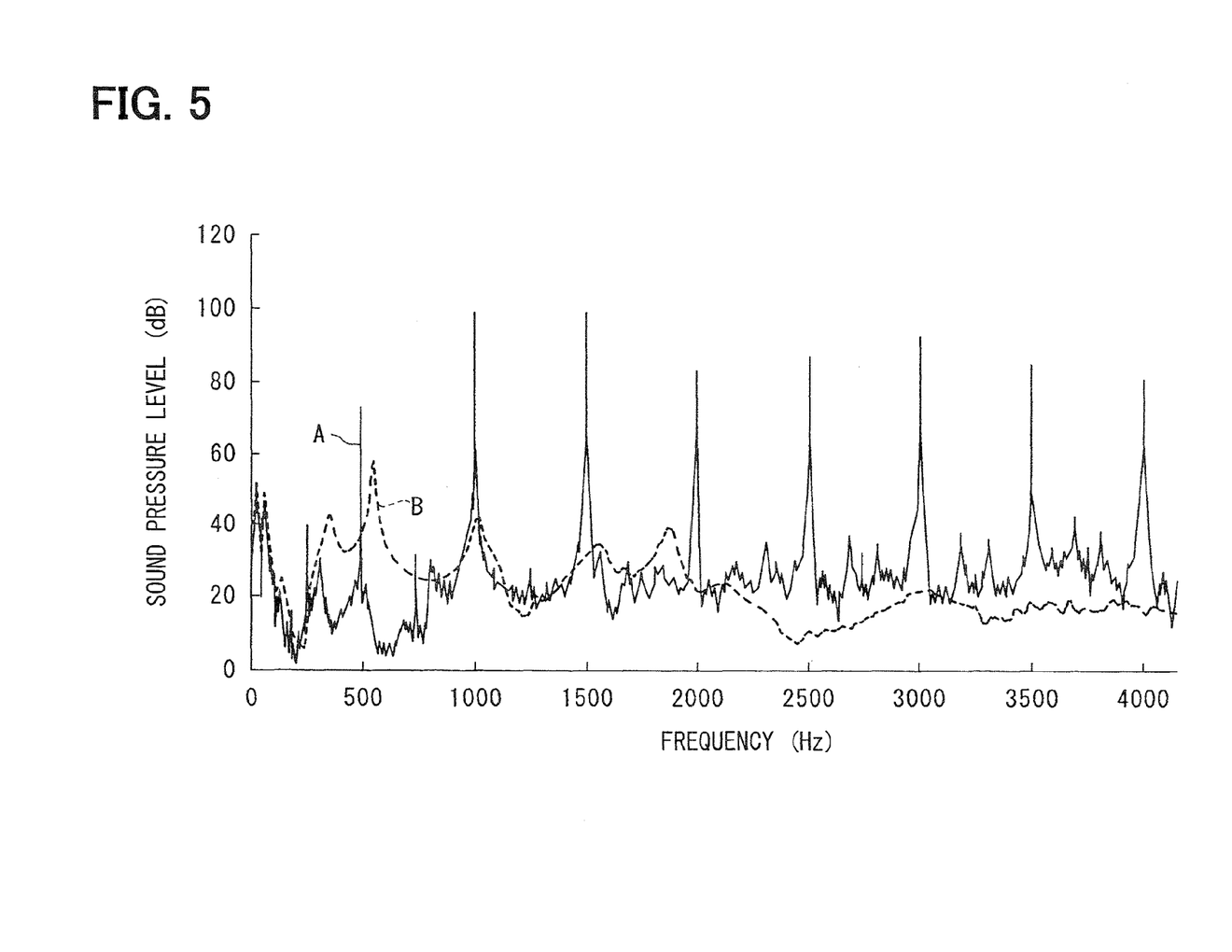
FIG. 5 is a diagram of frequency characteristics of the sound generated by the vehicular horn of the vehicle presence notification apparatus of the present disclosure.

The frequency characteristic of the vehicular horn 2 at a time of using the vehicular horn 2 as a dynamic speaker is shown by a dashed line B of FIG. 5. The dashed line B shows the frequency characteristics when a sweep signal (i.e., a variable signal transiting from a low frequency to a high frequency) of 1 V in a sine wave form is provided for the vehicular horn 2.

Figure 4B:
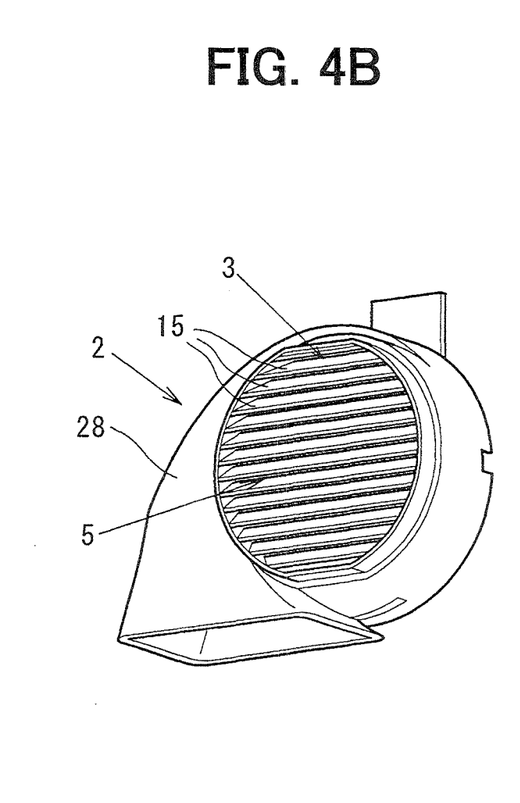
FIG. 4B is a perspective view of the vehicle presence notification apparatus of the present disclosure.

With reference to FIG. 4B, the vehicular horn 2 in the present embodiment includes a swirl horn 28 that has a slightly curved body or curved contour (i.e., a trumpet member in a swirling shape: a sound tube in a swirl shape). The swirl horn 28 amplifies the sound generated by the vibration of the vibration board 23, and radiates the amplified sound outward from the vehicle to the surrounding area. Though the present embodiment uses such horn 28, the swirl horn 28 may be replaced with another type, such as a disk type horn or the like.

Figure 6A:
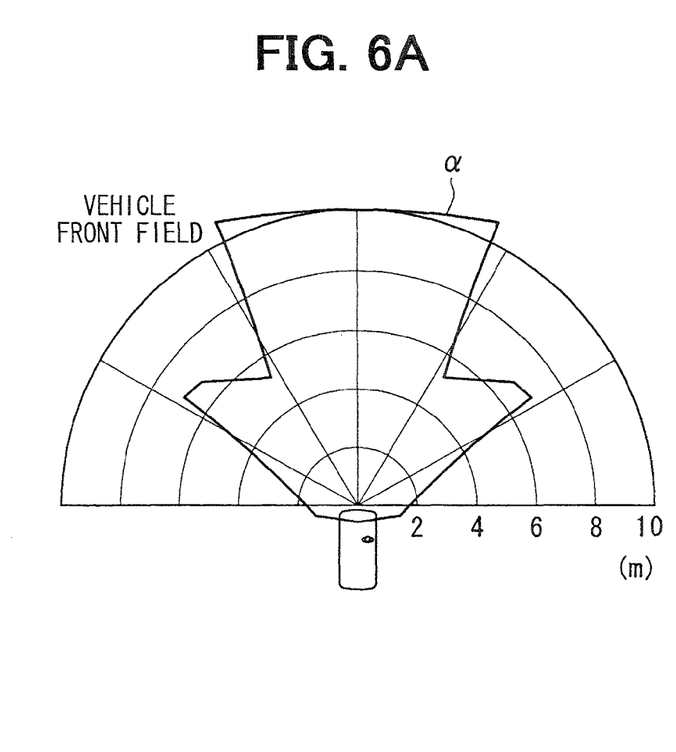
FIGS. 6A and 6B is an illustration of outreach areas of a notification sound of the present disclosure.
Figure 6B:
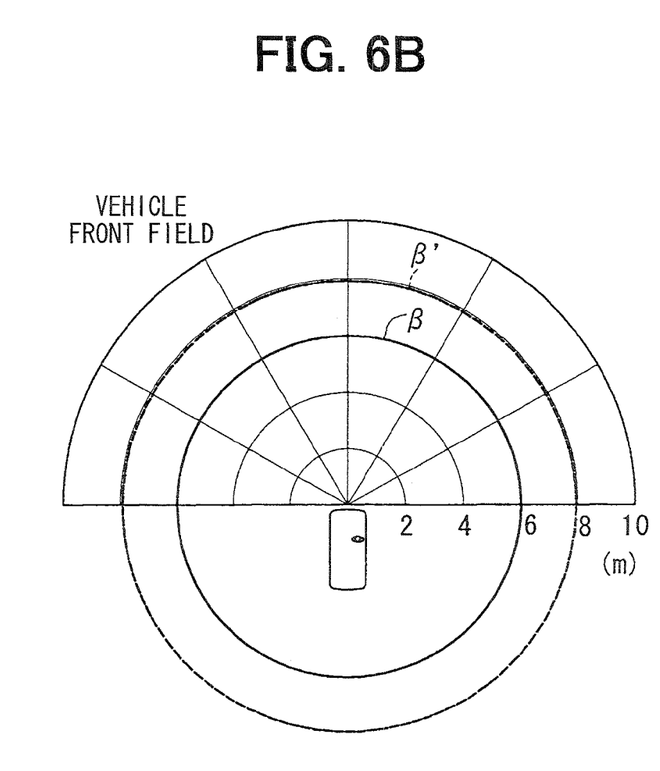

FIG. 6A illustrates a coverage area α of the notification sound from the parametric speaker 1, and FIG. 6B illustrates a coverage area β of the notification sound from the vehicular horn 2. The coverage areas α and β show the areas of the notification sound with its sound pressure measured as 50 dB or more. As described above, the supersonic speaker 3 of the present embodiment is disposed to emit a supersonic sound outward from the vehicle toward a front field of the vehicle.

The vehicular horn 2 is arranged to emit the notification sound substantially evenly around the vehicle, as shown in FIG. 6B. The horn opening of the swirl horn 28 of the vehicular horn 2, from which the notification sound is emitted, is directed in a downward direction of the vehicle to face the road surface. The direction of the horn opening may also be set to another direction, and such directivity may be realized by way of a reflector or the like.

(Control Circuit 8)

With continuing reference to FIGS. 3 and 4A, the control circuit 8 is implemented as a microcomputer chip 31 on a control board. The control circuit 8 may be disposed inside of a horn housing of the vehicular horn 2 (FIG. 4A), though the installation position of the control circuit 8 may not be limited to such a form.

With continuing reference to FIGS. 1 and 2, the control circuit 8 includes:

(a) the microcomputer chip 31, (b) a supersonic drive amplifier 32 for driving the plurality of supersonic transducers 12 other than the one that is used as the reflected sound pressure detecting unit 6, (c) a switching element 33 for driving the vehicular horn 2, (d) a reception circuit 34 for providing a detection signal that is detected by the reflected sound pressure detecting unit 6, (e) a determination unit 35 (i.e., a control program) for determining whether a driving state of the vehicle matches a notification sound generation condition, (f) a notification sound generation unit 36 (i.e., a control program) for generating a frequency signal of the notification sound when the driving state of the vehicle matches the notification sound generation condition, (g) a supersonic sound modulation unit 37 (i.e., a control program) for modulating the frequency signal of the notification sound from the notification sound generation unit 36 to a signal having the supersonic frequency, (h) a switching element control unit 38 (i.e., a control program) for performing an ON-OFF control of the switching element 33 according to a determination result of the determination unit 35 or an operation state of the horn switch, and (i) a sound pressure supplement unit 7 (i.e., a control program) for increasing the sound pressure of the notification sound generated by the vehicular horn 2, when the sound pressure of the supersonic sound detected by the reflected sound pressure detecting unit 6 is high.

In the following, each of the above-described components (a) to (i) in the control circuit 8 is described.

(Microcomputer Chip 31)

The microcomputer chip 31 is a computer having a CPU, a memory to store various programs, an input circuit, an output circuit and the like. The programs stored in the microcomputer chip 31 allow the microcomputer 31 to operate the parametric speaker 1 and the vehicular horn 2. For example, the programs may allow the microcomputer chip 31 to control the supersonic drive amplifier 32 and the switching element 33 according to input signals, where the microcomputer may receive inputs from an input/output terminal (I/O), vehicle speed pulse, and the horn switch (FIG. 2). Additionally, the microcomputer chip 31 may be coupled to the battery (B+).

(Switching Element 33)

The switching element 33 serves as an ON-OFF unit to apply a battery voltage to the vehicular horn 2 when the switching element 33 is turned ON. The switching element 33 may be implemented as an FET power transistor. When the switching element 33 is continuously turned ON, the electric current interrupter 27 is activated to repeatedly couple and decouple the fixed contact point 25 and the movable contact point 26, as described earlier, thereby generating the warning sound from the vehicular horn 2.

Further, by performing a duty ratio control on the switching element 33 based on a frequency signal of the notification sound, the switching element 33 can generate the notification sound in the audible frequency band directly from the vehicular horn 2 without causing connection and disconnection of the electric current interrupter 27 (i.e. without producing the warning sound).

(Reception Circuit 34)

The reception circuit 34 includes a filter circuit (e.g., a CR element or the like) for removing noise from the electrical signal provided by the reflected sound pressure detecting unit 6, and provides the electrical signal that has passed the filter circuit to microcomputer chip 31. Further, when the electrical signal from the reflected sound pressure detecting unit 6 is weak, the reception circuit 34 has an amplifier to amplify the weak signal.

(Determination Unit 35)

As provided above, the determination unit 35 is configured to operate the notification sound generation unit 36 when the driving state of the vehicle matches the notification sound generation condition. For example, the determination unit 35 may operate the notification sound generation unit 36 when the vehicle travels at a predetermined speed of 20 km/h or lower, determining that the driving state of the vehicle matches the notification sound generation condition. The contents of determination may be modified or may have different condition, and not limited only to such condition.

(Notification Sound Generation unit 36)

The notification sound generation unit 36 generates a signal of a notification sound (i.e., an electric signal having an audible frequency) upon receiving an operation instruction from the determination unit 35. The signal of the notification sound may be referred to as the notification sound signal. The notification sound generation unit 36 may be implemented as sound software and may produce the signal digitally.

(Supersonic Sound Modulation Unit 37)

The supersonic sound modulation unit 37 performs a supersonic modulation to the notification sound signal from the notification sound generation unit 36. In the present embodiment, the supersonic sound modulation unit 37 uses amplitude modulation (AM) for modulating the notification sound signal into a signal of amplitude change (i.e., an increase and decrease change of the voltage) in the supersonic sound frequency (e.g., 25 kHz).

The modulation method of the supersonic sound modulation unit 37 may not be limited to AM, but may include other methods, such as pulse width modulation (PWM) in the supersonic frequency. In PWM, the notification sound signal is modulated into a signal of width change (i.e., width of the pulse generation time) in the supersonic sound frequency.

Figure 7A:
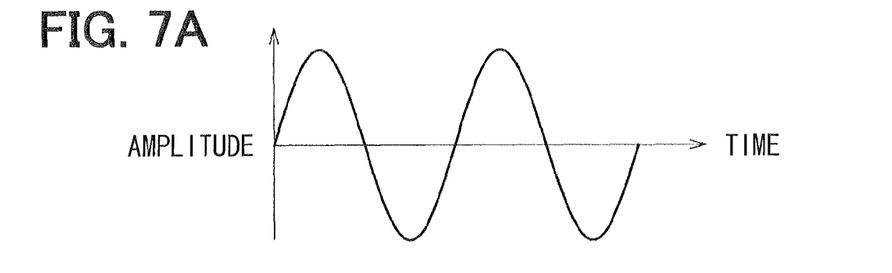
FIGS. 7A, 7B, 7C, 7D and 7E are step-by-step illustrations of an operation principle of the parametric speaker.
Figure 7B:
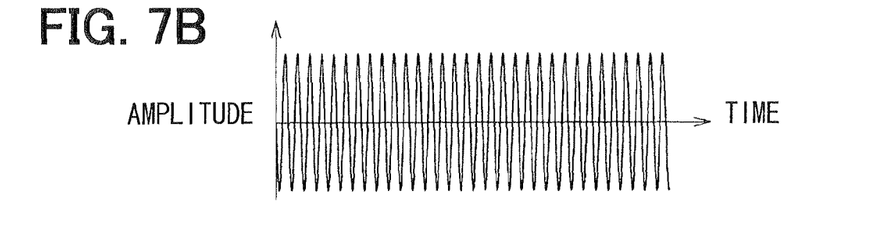

An example of the supersonic modulation by the supersonic sound modulation unit 37 is explained with reference to FIGS. 7A to 7C. In FIG. 7A, the notification sound signal as a voltage change having a wave form of a single frequency. In FIG. 7B, a supersonic sound oscillator in the control circuit 8 oscillates at a supersonic frequency. The signal wave forms provided in FIGS. 7A and 7B are shown for explanation purposes, and it should be understood to one skilled in the art that the wave forms may take another form.

The supersonic sound modulation unit 37 receives the notification sound signal, and performs the following:

(i) as the signal voltage of the frequency signal to generate a notification sound increases, the supersonic sound modulation unit 37 increases the amplitude of the voltage of the supersonic sound vibration, and (ii) as the signal voltage of the frequency signal to generate a notification sound decreases, the supersonic sound modulation unit 37 decreases the amplitude of the voltage by the supersonic sound vibration.

Figure 7C:
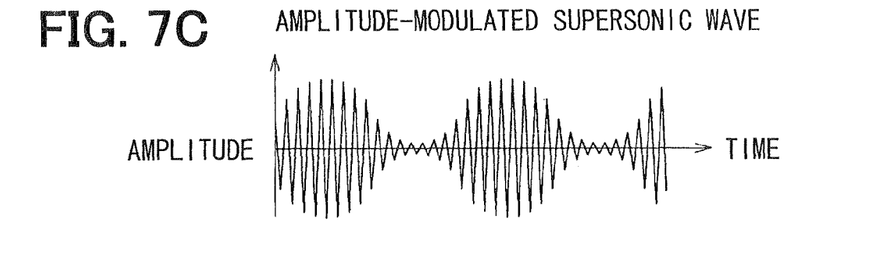

In the above-described manner, the supersonic sound modulation unit 37 modulates the frequency signal of the notification sound signal from the notification sound generation unit 31 into the amplitude change of the oscillation voltage having the supersonic frequency (FIG. 7C).

(Supersonic Drive Amplifier 32)

The supersonic drive amplifier 32 drives the supersonic speaker 3 based on the supersonic frequency signal modulated by the supersonic sound modulation unit 37. Specifically, the supersonic drive amplifier generates, from each of the supersonic transducers 12, the supersonic sound by controlling the applied voltage (i.e., charge and discharge of electricity) on each of the supersonic transducers 12. The supersonic drive amplifier 32 may be a push-pull type class B amplifier.

(Switching Element Control Unit 38)

The switching element control unit 38 performs an ON-OFF control of the switching element 33, to control the supply of electric power to the vehicular horn 2 from the battery. The switching element control unit 38 is implemented as:

(i) a warning sound generation unit (i.e., a control program) for generating the warning sound from the vehicular horn 2 by maintaining the switching element 33 in the ON state for applying the battery voltage to the vehicular horn 2 while the horn switch is turned ON (i.e. operated by a user), and (ii) a duty ratio control unit (i.e., a control program) for generating the notification sound in the audible frequency by performing a duty ratio control of the switching element 33 while the notification sound generation unit 36 is generating the notification sound signal. In other words, the duty ratio control unit serves as a digital amplifier (i.e., a class D amplifier) by controlling the switching element 33 to perform a switching operation.

Further, the warning sound produced during the activation of the horn switch by the user has a higher priority than the generation of the notification sound in the audible frequency. Therefore, when the horn switch is turned ON, the switching element control unit 38 always generates the warning sound from the vehicular horn 2.

(Sound Pressure Supplement Unit 7)

As provided above, the sound pressure supplement unit controls the sound pressure of the notification sound generated by the vehicular horn 2. Specifically, when the reflected sound pressure detected by the reflected sound pressure detecting unit 6 (i.e., one of the supersonic transducers 12 in the collective arrangement) is higher than a standard sound pressure, the sound pressure supplement unit 7 increases the sound pressure of the notification sound generated by the vehicular horn 2 by a predetermined amount. The sound pressure supplement unit 7 may increase the sound pressure of the notification sound by controlling the amplitude of the notification sound produced by the duty ratio control unit of the switching element control unit 38.

The standard sound pressure may be a predetermined value, and may be provided as a signal level input to the microcomputer chip 31. The standard sound pressure is provided as a sound pressure value in-between (a) a sound pressure detected by the reflected sound pressure detecting unit 6, when the sound emission opening 5 is obstructed by a foreign material/matter, such as snow, and (b) a sound pressure detected by the reflected sound pressure detecting unit 6, when the sound emission opening 5 is not obstructed by foreign matter (i.e., a normal state of the sound emission opening 5).

In such configuration, when foreign matter obstructs the sound emission opening 5, the sound pressure detected by the reflected sound pressure detecting unit 6 is higher than the standard sound pressure. The sound pressure detected by the reflected sound pressure detecting unit 6 may be referred to as a reflected sound pressure.

During normal operation (i.e. normal state of the sound emission opening 5), the notification sound produced by the vehicular horn 2 may have a sound pressure level configured to about 50 dB. The notification sound from the vehicular horn 2 may have a coverage of about six meters from the vehicle with the sound pressure level about of 50 dB, which is illustrated as a solid line β in FIG. 6B.

On the other hand, when the sound pressure detected by the reflected sound pressure detecting unit 6 is greater than the standard sound pressure, the sound pressure supplement unit 7 may increase the sound pressure of the notification sound produced by the vehicular horn 2, such that the notification sound may be heard at a distance greater than six meters. For example, the sound pressure supplement unit 7 increases the sound pressure of the notification sound, so that the coverage of the notification sound may be about eight meters from the vehicle, which is illustrated as a broken line β' in FIG. 6B, and has a sound pressure measurement of about 50 dB at the eight meter perimeter.

(Operation of Vehicle Presence Notification Apparatus)

When the driving state of the vehicle matches the notification sound generation condition, the notification sound generation unit 36 outputs the notification sound signal, and the supersonic speaker 3 radiates the supersonic sound (i.e., an inaudible sound) toward the front field of the vehicle by performing the supersonic modulation on the notification sound signal.

Figure 7D:
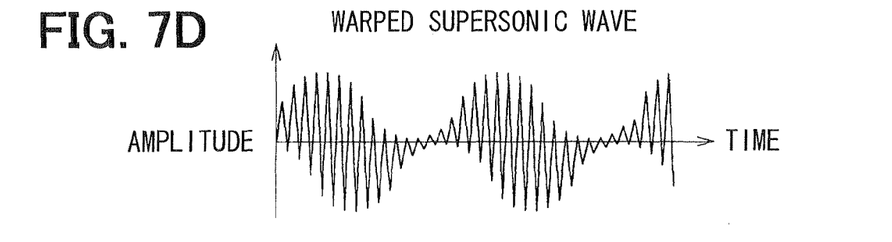
Figure 7E:
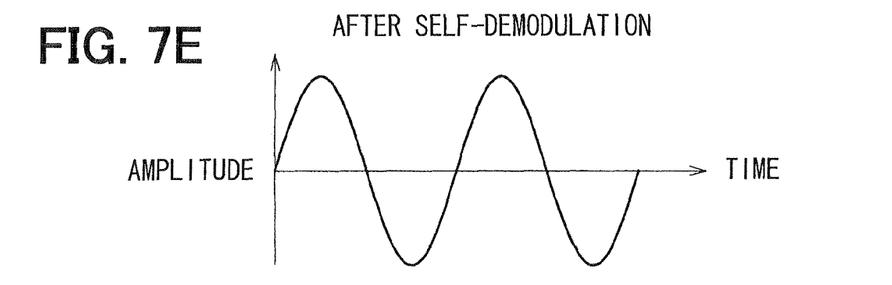

As the supersonic sound travels in the air, the supersonic sound having a short wavelength is warped by the viscosity of the air, or the like. In other words, the edge of the supersonic sound dulls, due to the attenuation of the wave energy. An example of such change is provided in FIG. 7D. As a result, an amplitude component in the supersonic sound is self-demodulated during such travel, thereby reproducing the notification sound. An example of the notification sound after self-demodulation is provided in FIG. 7E. The notification sound reproduced from the supersonic sound is audible at a position that is distant from the vehicle.

Further, the notification sound signal is also provided to the switching element control unit 38 to produce the notification sound in the audible frequency from the vehicular horn 2 by way of the duty ratio control unit of the switching element control unit 38.

When foreign matter (e.g. snow, water, or the like) accumulates on the sound emission opening 5 of the supersonic speaker 3, the supersonic sound may be reflected by the foreign matter, thereby not allowing the supersonic sound from radiating outward from the vehicle. In other words, the supersonic sound may not be emitted toward the front field of the vehicle in order to produce the notification sound in an audible frequency a distant position from the vehicle.

In the present embodiment, when foreign matter accumulates on the sound emission opening 5, the reflected sound pressure detecting unit 6 may detect an increase of sound pressure. Specifically, the supersonic sound produced from the supersonic transducers 12 is reflected by the foreign matter causing an increase in sound pressure, which is detected by the reflected sound pressure detecting unit 6

When the reflected sound pressure detecting unit 6 detects a sound pressure greater than the standard sound pressure, the sound pressure supplement unit 7 increases the sound pressure of the notification sound generated by the vehicular horn 2. As a result, a decrease in the sound pressure of the notification sound emitted from the sound emission opening 5 (i.e. the parametric speaker 1) is compensated by an increase of the sound pressure of the notification sound from the vehicular horn 2, thereby preventing the decrease of the overall sound pressure in the front field of the vehicle.

Therefore, even if foreign matter blocking the supersonic speaker 3 prevents the radiation of the supersonic sound from the sound emission opening 5, the decrease of the sound pressure of the notification sound to be radiated to the vicinity of the vehicle is prevented, thereby enabling the vehicle presence notification apparatus to notify an area of the approach/presence of the vehicle.

The reflected sound pressure detecting unit 6 in the present embodiment is implemented as one of the supersonic transducers 12 arranged in the supersonic speaker 3. Therefore, a sound pressure detection microphone may not be needed in the supersonic speaker 3 of the vehicle presence notification apparatus, thereby preventing an increase of production cost of the apparatus.

In the present embodiment, the vehicular horn 2, which generates a warning sound when the horn switch is activated, is used as a dynamic speaker for generating the notification sound. Therefore, a dedicated dynamic speaker for generating the notification sound may not be needed, thereby preventing an increase in cost as well as improving the installability of the vehicle presence notification apparatus in the vehicle.

The sound pressure detection method provided above may be modified such that an increase of the sound pressure of the notification sound from the dynamic speaker may be controlled as a gradual change. Specifically, instead of detecting whether the sound pressure of the supersonic sound is above a standard value, as described above, the sound pressure of the notification sound from the dynamic speaker may be increased in proportion to the increase of the sound pressure detected the reflected sound pressure detecting unit 6 of the supersonic sound reflected by the foreign matter on the sound emission opening 5.

In such manner, the capacity change of the parametric speaker 1 is supplemented by the dynamic speaker (e.g., the vehicular horn 2), and the sound pressure of the notification sound is kept substantially at the same level. For example, even when the waterproof sheet 14 is wet and is reflecting the supersonic sound, thereby causing the capacity decrease of the parametric speaker 1, such capacity decrease is supplemented by the dynamic speaker (i.e., the vehicular horn 2).

Based on the above, the vehicle presence notification apparatus may include the parametric speaker 1 and the vehicular horn 2. The parametric speaker 1 may provide a supersonic sound, which radiates outward from a vehicle, by performing a supersonic modulation of the notification sound signal. The vehicular horn 2 may be used as a dynamic speaker to produce the notification sound in an audible frequency. The vehicle presence notification apparatus notifies the presence of the vehicle by way of the notification sound generated by the parametric speaker 1 and vehicular horn 2.

The parametric speaker 1 may include the supersonic speaker 3 to generate the supersonic sound from a plurality of supersonic sound generation unit 4. The supersonic sound is emitted from the sound emission opening 5 outward from the vehicle. The reflected sound pressure detecting unit 6 detects a sound pressure of a supersonic sound that is reflected back from the sound emission opening 5 toward the supersonic sound generation unit 4. Further, the vehicle presence notification apparatus includes a sound pressure supplement unit 7 for increasing the sound pressure of the notification sound generated by the vehicular horn 2 when the reflected sound pressure detected by the reflected sound pressure detecting unit 6 is high.

Therefore, when snow or other matter accumulates on or sticks to the sound emission opening 5 of the supersonic speaker 3, thereby resulting in (a) reflecting the supersonic sound from a supersonic sound generation unit 4 and (b) preventing the supersonic sound from radiating toward the outside of the vehicle, the sound pressure of the reflected sound detected by the reflected sound pressure detecting unit 6 increase. That is, the sound pressure of the sound reflected at the sound emission opening 5 toward the supersonic sound generation unit 4 increases. Upon detecting such increase of the sound pressure, the vehicle presence notification apparatus increases the sound pressure of the notification sound generated by a dynamic speaker.

As a result, the decrease of the sound pressure of the notification sound generated by the parametric speaker is compensated by the increase of the sound pressure of the notification sound generated by the dynamic speaker, thereby preventing the decrease of the notification sound radiated outward from the vehicle to the vicinity of the vehicle.

Although the present disclosure has been fully described in connection with preferred embodiments thereof with reference to the accompanying drawings, it is to be noted that various changes and modifications will become apparent to those skilled in the art. For example, in the present embodiment, use of one of the collectively-arranged supersonic transducers 12 to implement a reflected sound pressure detecting unit 6 is shown as an example. However, a device which is different from the supersonic transducer 12 (e.g., a microphone) may be implemented as a reflected sound pressure detecting unit 6 in the supersonic speaker 3.

Additionally, in the embodiment mentioned above, use of the vehicular horn 2 as an example of the dynamic speaker is shown. However, separate from the vehicular horn 2 dedicated for generating the warning sound, another vehicular horn 2 dedicated for generating the notification sound may be provided in the vehicle. Such vehicular horn 2 for generating the notification sound may have the same structure as the one for generating the warning sound.

Changes, modifications, and summarized schemes are to be understood as being within the scope of the present disclosure as defined by appended claims.

What is claimed is:

1. A vehicle presence notification apparatus comprising:
a dynamic speaker radiating a notification sound from a vehicle in an audible frequency, the dynamic speaker including a sound pressure supplement unit to control a sound pressure of the notification sound; and
a parametric speaker including a supersonic speaker generating a supersonic sound from a supersonic sound generation unit, the supersonic sound generation unit being disposed in a housing, the housing defines a sound emission opening for radiating the supersonic sound outward from the vehicle, the parametric speaker further including a reflected sound pressure detecting unit to detect a reflected sound pressure generated by a reflection of the supersonic sound from the sound emission opening toward the parametric speaker, wherein
the supersonic sound is a frequency signal of the notification sound modulated at a supersonic frequency, and
the sound pressure supplement unit increases the sound pressure of the notification sound radiated by the dynamic speaker based on the reflected sound pressure detected by the reflected sound pressure detecting unit.

2. The vehicle presence notification apparatus of claim 1, wherein
the supersonic sound generation unit is a collective arrangement of a plurality of supersonic transducers for generating a compression wave having a supersonic frequency in air, and
the reflected sound pressure detecting unit is provided as at least one of the supersonic transducers.

3. The vehicle presence notification apparatus of claim 1, wherein when the reflected sound pressure detected by the reflected sound pressure detecting unit is greater than a standard sound pressure, the sound pressure supplement unit increases the sound pressure of the notification sound radiated by the dynamic speaker by a predetermined value.

4. The vehicle presence notification apparatus of claim 1, wherein when the reflected sound pressure detected by the reflected sound pressure detecting unit increases, the sound pressure supplement unit proportionally increases the sound pressure of the notification sound radiated by the dynamic speaker.

5. The vehicle presence notification apparatus of claim 1, wherein the dynamic speaker is implemented as an electromagnetic type vehicular horn that generates a warning sound when a horn switch is activated.

* * * * *